(12) United States Patent
Onodera

(10) Patent No.: US 10,104,309 B2
(45) Date of Patent: Oct. 16, 2018

(54) IMAGING APPARATUS, FLICKER DETECTION METHOD, AND FLICKER DETECTION PROGRAM

(71) Applicant: FUJIFILM Corporation, Tokyo (JP)

(72) Inventor: Tatsuo Onodera, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/693,921

(22) Filed: Sep. 1, 2017

(65) Prior Publication Data

US 2017/0366730 A1    Dec. 21, 2017

Related U.S. Application Data

(63) Continuation of application No. PCT/JP2015/082446, filed on Nov. 18, 2015.

(30) Foreign Application Priority Data

Mar. 2, 2015   (JP) .................................. 2015-040267

(51) Int. Cl.
    *H04N 5/235*      (2006.01)
    *H04N 5/357*      (2011.01)
    (Continued)

(52) U.S. Cl.
CPC ........... *H04N 5/2357* (2013.01); *H04N 5/243* (2013.01); *H04N 5/357* (2013.01); *H04N 5/3532* (2013.01)

(58) Field of Classification Search
CPC .... H04N 5/2357; H04N 5/357; H04N 5/3532; H04N 5/243

(Continued)

(56) References Cited

U.S. PATENT DOCUMENTS

2002/0044205 A1   4/2002  Nagaoka et al.
2002/0158971 A1  10/2002  Daiku et al.
(Continued)

FOREIGN PATENT DOCUMENTS

CN       103856721 A    6/2014
JP      2002-84466 A    3/2002
(Continued)

OTHER PUBLICATIONS

International Search Reoprt dated Jan. 12, 2016 in International Application No. PCT/JP2015/082446 with an English Translation.
(Continued)

*Primary Examiner* — Lin Ye
*Assistant Examiner* — Chan T Nguyen
(74) *Attorney, Agent, or Firm* — Birch, Stewart, Kolasch & Birch, LLP

(57) ABSTRACT

An imaging apparatus includes: an imaging element; an imaging element driving unit that directs the imaging element to alternately perform imaging operations at a first frame rate and a second frame rate being different from the first frame rate; and a flicker detection unit that detects whether a first flicker of a light source with a first frequency is present and whether a second flicker of a light source with a second frequency is present, based on a first captured image signal obtained by an imaging operation at the first frame rate and a second captured image signal obtained by an imaging operation at the second frame rate as defined herein, and a sum of a duration of a first frame period based on the first frame rate and a duration of a second frame period based on the second frame rate is a value as defined herein.

19 Claims, 10 Drawing Sheets

(51) Int. Cl.
*H04N 5/353* (2011.01)
*H04N 5/243* (2006.01)

(58) Field of Classification Search
USPC ...................................................... 348/226.1
See application file for complete search history.

(56) References Cited

U.S. PATENT DOCUMENTS

| | | | |
|---|---|---|---|
| 2005/0046704 A1 | 3/2005 | Kinoshita | |
| 2008/0309791 A1* | 12/2008 | Nishiwaki | H04N 5/23293 348/226.1 |
| 2010/0013953 A1* | 1/2010 | Niikura | H04N 5/2353 348/226.1 |
| 2012/0154629 A1* | 6/2012 | Horiuchi | H04N 7/0127 348/226.1 |
| 2014/0153839 A1 | 6/2014 | Tsuzuki | |

FOREIGN PATENT DOCUMENTS

| | | |
|---|---|---|
| JP | 2002-207162 A | 7/2002 |
| JP | 2002-330350 A | 11/2002 |
| JP | 2005-33616 A | 2/2005 |
| JP | 2008-109253 A | 5/2008 |
| JP | 2008-147713 A | 6/2008 |
| JP | 2010-98416 A | 4/2010 |
| JP | 2014-110621 A | 6/2014 |

OTHER PUBLICATIONS

Written Opinion of the International Searching Authority dated Jan. 12, 2016 in International Application No. PCT/JP2015/082446 with an English Translation.
Chinese Office Action and Search Report for corresponding Chinese Application No. 201580077315.9, dated Feb. 2, 2018, with an English translation of the Chinese Office Action.

* cited by examiner

IMAGING APPARATUS, FLICKER DETECTION METHOD, AND FLICKER DETECTION PROGRAM

CROSS REFERENCE TO RELATED APPLICATION

This is a continuation of International Application No. PCT/JP2015/082446 filed on Nov. 18, 2015, and claims priority from Japanese Patent Application No. 2015-040267 filed on Mar. 2, 2015, the entire disclosures of which are incorporated herein by reference.

BACKGROUND OF THE INVENTION

1. Field of the Invention

The present invention relates to an imaging apparatus, a flicker detection method, and a computer readable medium storing a flicker detection program.

2. Description of the Related Art

In an imaging apparatus comprising an imaging element that captures an image of an object using a plurality of pixels which convert light into an electric signal, in a case in which a motion picture is captured under a fluorescent lamp, uneven horizontal stripes are likely to be generated in the captured image by the influence of a periodical change (so-called flicker) in brightness caused by the flicker cycle (for example, $1/100$ seconds or $1/120$ seconds in the case of a commercial power supply with a frequency of 50 hertz (Hz) or 60 Hz) of a light source of the fluorescent lamp.

A flicker of a light source that is operated by a commercial power supply with a frequency of 50 Hz is a first flicker with a first frequency (100 Hz that is two times higher than a power supply frequency). Hereinafter, the first flicker is referred to as a 50-Hz flicker. In addition, a flicker of a light source that is operated by a commercial power supply with a frequency of 60 Hz is a second flicker with a second frequency (120 Hz that is two times higher than the power supply frequency). Hereinafter, the second flicker is referred to as a 60-Hz flicker.

JP2002-84466A and JP2008-147713A disclose an imaging apparatus that determines whether a 50-Hz flicker and a 60-Hz flicker are present, on the basis of the result of comparison between two captured image data items obtained when the exposure time is set to a natural number multiple of $1/120$ seconds and the result of comparison between two captured image data items obtained when the exposure time is set to a natural number multiple of $1/100$ seconds.

JP2002-330350A discloses an imaging apparatus that maintains the exposure time which is set to a natural number multiple of $1/120$ seconds in a case in which there is no brightness difference between two captured image data items obtained at the set exposure time and sets the exposure time to a natural number multiple of $1/100$ seconds in a case in which there is a brightness difference between the two captured image data items to prevent the deterioration of image quality due to a flicker.

JP2005-33616A discloses an imaging apparatus that alternately increases and decreases each frame period, which is the time from a falling edge to the next falling edge of a vertical synchronizing signal of an imaging element, by a predetermined period of time and compares captured image signals obtained for two adjacent frame periods to determine whether imaging is performed under a fluorescent lamp.

SUMMARY OF THE INVENTION

In the imaging apparatus disclosed in JP2002-84466A and JP2008-147713A, the exposure time is changed to detect a flicker is changed. Therefore, in a case in which a motion picture that is being captured, such as a live view image, is displayed on a display unit, the quality of the display image is likely to deteriorate due to the change in the exposure time. In order to prevent the deterioration of the quality, it is necessary to correct the gain of the display image according to the change in the exposure time. As a result, the process of the entire system becomes complicated.

The imaging apparatus disclosed in JP2002-330350A detects a flicker while maintaining the exposure time at a constant value, but cannot distinguish and detect whether a 50-Hz flicker or a 60-Hz flicker has occurred.

The imaging apparatus disclosed in JP2005-33616A maintains the exposure time at a constant value and determines only whether imaging is performed under a fluorescent lamp. Therefore, it is difficult to distinguish and detect whether a 50-Hz flicker or a 60-Hz flicker has occurred.

In the description, the frequency of the commercial power supply is 50 Hz and 60 Hz. However, the frequency is not limited to these values.

The invention has been made in view of the above-mentioned problems and an object of the invention is to provide an imaging apparatus, a flicker detection method, and a computer readable medium storing a flicker detection program that can distinguish and detect flickers of light sources with different frequencies, using a simple process, without changing an exposure time.

An imaging apparatus according to the invention comprises: an imaging element; an imaging element driving unit that directs the imaging element to alternately perform imaging operations at a first frame rate and a second frame rate different from the first frame rate; and a flicker detection unit that detects whether a first flicker of a light source with a first frequency is present and whether a second flicker of a light source with a second frequency is present, on the basis of a first captured image signal obtained by an imaging operation at the first frame rate and a second captured image signal obtained by an imaging operation at the second frame rate. A sum of the duration of a first frame period based on the first frame rate and the duration of a second frame period based on the second frame rate is a value obtained by multiplying a reciprocal of the first frequency or the second frequency by a natural number. The flicker detection unit detects whether the first flicker is present and whether the second flicker is present, on the basis of a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

A flicker detection method according to the invention comprises: an imaging element driving step of directing an imaging element to alternately perform imaging operations at a first frame rate and a second frame rate different from the first frame rate; and a flicker detection step of detecting whether a first flicker of a light source with a first frequency is present and whether a second flicker of a light source with a second frequency is present, on the basis of a first captured image signal obtained by an imaging operation at the first frame rate and a second captured image signal obtained by an imaging operation at the second frame rate. A sum of the duration of a first frame period based on the first frame rate and the duration of a second frame period based on the second frame rate is a value obtained by multiplying a reciprocal of the first frequency or the second frequency by a natural number. In the flicker detection step, it is detected whether the first flicker is present and whether the second flicker is present, on the basis of a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

A flicker detection program according to the invention causes a computer to perform: an imaging element driving step of directing an imaging element to alternately perform imaging operations at a first frame rate and a second frame rate different from the first frame rate; and a flicker detection step of detecting whether a first flicker of a light source with a first frequency is present and whether a second flicker of a light source with a second frequency is present, on the basis of a first captured image signal obtained by an imaging operation at the first frame rate and a second captured image signal obtained by an imaging operation at the second frame rate. A sum of the duration of a first frame period based on the first frame rate and the duration of a second frame period based on the second frame rate is a value obtained by multiplying a reciprocal of the first frequency or the second frequency by a natural number. In the flicker detection step, it is detected whether the first flicker is present and whether the second flicker is present, on the basis of a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

According to the invention, it is possible to provide an imaging apparatus, a flicker detection method, and a computer readable medium storing a flicker detection program that can distinguish and detect flickers of light sources with different frequencies, using a simple process, without changing an exposure time.

EXPLANATION OF REFERENCES

5: imaging element
10: imaging element driving unit
11: system control unit
20: flicker detection unit

DESCRIPTION OF THE PREFERRED EMBODIMENTS

Hereinafter, an embodiment of the invention will be described with reference to the drawings.

Figure 1:
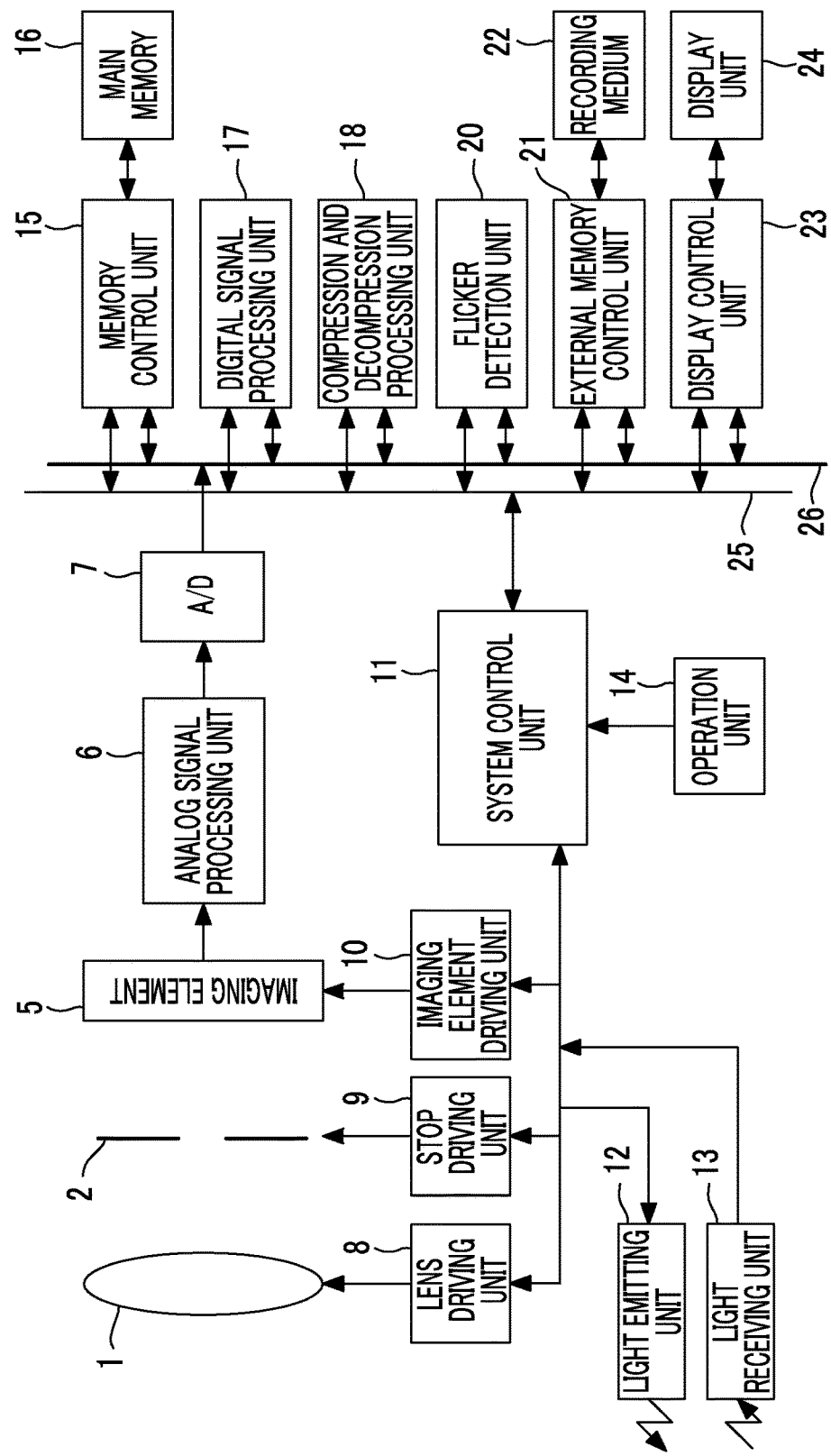
FIG. 1 is a diagram schematically illustrating the structure of a digital camera as an example of an imaging apparatus for describing an embodiment of the invention.

FIG. 1 is a diagram schematically illustrating the structure of a digital camera as an example of an imaging apparatus for describing an embodiment of the invention.

An imaging system of the digital camera illustrated in FIG. 1 comprises an imaging optical system (including an imaging lens 1 and a stop 2) and an imaging element 5.

The imaging element 5 includes a plurality of pixels which are two-dimensionally arranged and convert light into an electric signal and captures an image of an object using the plurality of pixels. The pixel includes a photodiode or a photoelectric conversion element using an organic photoelectric conversion film.

The imaging element 5 is a metal-oxide semiconductor (MOS) imaging element in which a signal can be read from an arbitrary pixel by the designation of an XY address. In this embodiment, the imaging element 5 is a MOS type. However, the imaging element may be a charge coupled device (CCD) type.

A system control unit 11 that controls the overall operation of the entire electric control system of the digital camera controls a light emitting unit 12 and a light receiving unit 13. In addition, the system control unit 11 controls a lens driving unit 8 such that the position of, for example, a focus lens included in the imaging lens 1 is adjusted. Further, the system control unit 11 controls the amount of opening of the stop 2 through a stop driving unit 9 to adjust the amount of exposure.

The system control unit 11 drives the imaging element 5 through an imaging element driving unit 10 such that an object image captured through the imaging lens 1 is output as captured image signal. A command signal is input from a user to the system control unit 11 through an operation unit 14. The captured image signal includes a plurality of pixel signals which are two-dimensionally arranged in the X direction and the Y direction perpendicular to the X direction.

The imaging element driving unit 10 drives the imaging element 5 using a rolling shutter method. The rolling shutter method is a method that sequentially performs an exposure operation for one or more scanning lines (each line including a plurality of pixels arranged in the horizontal direction) that are arranged in the vertical direction in a MOS imaging element.

That is, the rolling shutter method is a method that sequentially resets the scanning lines, accumulates charge in each pixel of each scanning line, reads a signal from each scanning line, and sequentially reads the charge accumulated in each pixel (which is also referred to as a focal-plane shutter method).

A method for driving the imaging element 5 is not particularly limited. For example, the imaging element 5 may be driven by a global shutter method that starts to expose all of the pixels at the same time and stops the exposure at the same time.

At the time of a flicker detection operation which will be described below, the imaging element driving unit 10 directs the imaging element 5 to alternately perform imaging operations at a first frame rate and a second frame rate different from the first frame rate which are set by the system control unit 11.

The frame rate is a value indicating the number of frames (captured image signals) output from the imaging element 5 per unit time.

When the frame rate is, for example, 120 frames per second (fps), a period (hereinafter, referred to as a frame period) from a falling edge to the next falling edge of a vertical synchronizing signal used to drive the imaging element 5 is $1/120$ seconds.

Each of the first frame rate and the second frame rate is set to an arbitrary value such that the sum of the duration of a first frame period based on the first frame rate and the duration of a second frame period based on the second frame rate is a value (for example, $1/100$ seconds or $1/50$ seconds) obtained by multiplying the reciprocal (which is defined as the period of a 50-Hz flicker) of a first frequency (100 Hz) by a natural number or a value (for example, $1/120$ seconds or $1/60$ seconds) obtained by multiplying the reciprocal (which is defined as the period of a 60-Hz flicker) of a second frequency (120 Hz) by a natural number.

In the specification, the natural number may include a little tolerance. For example, a natural number=2 is not limited to only 2 and may include the range of 1.95 to 2.05.

For example, when the first frame rate is 85.7 fps and the second frame rate is 120 fps, the duration of the first frame period based on the first frame rate is 1/85.7 seconds and the duration of the second frame period based on the second frame rate is $1/120$ seconds.

The sum of 1/85.7 seconds and $1/120$ seconds is about $1/50$ seconds. Therefore, the above-mentioned conditions are satisfied.

For example, when the first frame rate is 105 fps and the second frame rate is 140 fps, the duration of the first frame period based on the first frame rate is $1/105$ seconds and the duration of the second frame period based on the second frame rate is $1/140$ seconds.

The sum of $1/105$ seconds and $1/140$ seconds is $1/60$ seconds. Therefore, the above-mentioned conditions are satisfied.

When flicker detection ends, the imaging element driving unit 10 drives the imaging element 5 at a predetermined frame rate or a predetermined shutter speed on the basis of the detection result.

For example, in a case in which a 50-Hz flicker is detected, the imaging element driving unit 10 drives the imaging element 5 under a first driving condition in which the frame rate is a value obtained by multiplying 100 fps by (1/L) (where L is a natural number) and the shutter speed is an arbitrary value.

Alternatively, in a case in which a 50-Hz flicker is detected, the imaging element driving unit 10 drives the imaging element 5 under a second driving condition in which the frame rate is an arbitrary value and the shutter speed is a value obtained by multiplying $1/100$ seconds by L.

The first driving condition and the second driving condition are driving conditions for preventing the deterioration of image quality due to a 50-Hz flicker (specifically, uneven horizontal stripes).

In a case in which a 60-Hz flicker is detected, the imaging element driving unit 10 drives the imaging element 5 under a third driving condition in which the frame rate is a value obtained by multiplying 120 fps by (1/L) and the shutter speed is an arbitrary value.

Alternatively, in a case in which a 60-Hz flicker is detected, the imaging element driving unit 10 drives the imaging element 5 under a fourth driving condition in which the frame rate is an arbitrary value and the shutter speed is a value obtained by multiplying $1/120$ seconds by L.

The third driving condition and the fourth driving condition are driving conditions for preventing the deterioration of image quality due to a 60-Hz flicker (specifically, uneven horizontal stripes).

When a flicker is not detected, the imaging element driving unit 10 drives the imaging element 5 under driving conditions in which the frame rate is an arbitrary value and the shutter speed is an arbitrary value.

Figure 2:
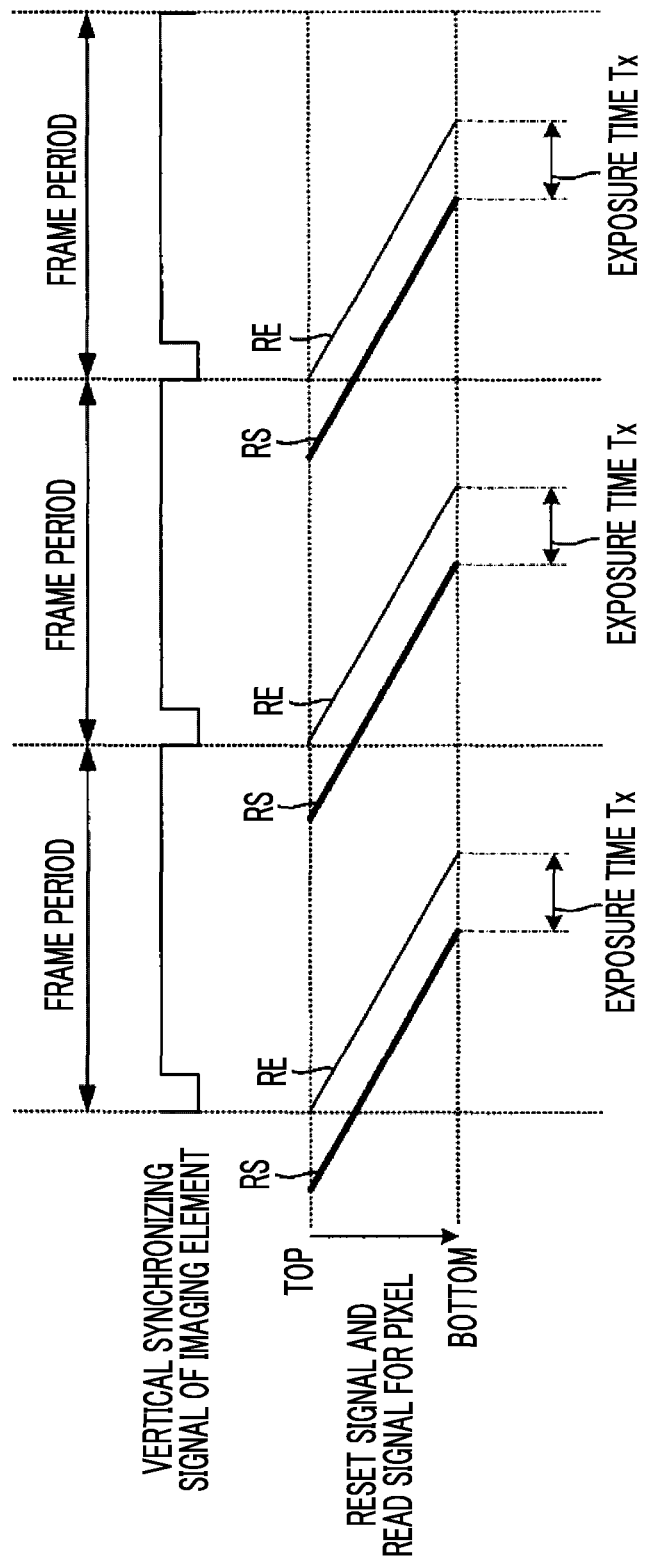
FIG. 2 is a timing chart illustrating the operation of an imaging element 5 after a flicker detection process.

FIG. 2 is a timing chart illustrating the operation of the imaging element 5 after the flicker detection process. In FIG. 2, letters RS indicate a reset signal for resetting the pixels of the imaging element 5. In FIG. 2, letters RE indicate a read signal for reading a signal from the pixels of the imaging element 5.

In this embodiment, the reset signal and the read signal can be independently supplied to each scanning line including a plurality of pixels which are arranged in the horizontal direction of the imaging element 5.

In the example illustrated in FIG. 2, at the time that is an exposure time Tx before the falling time of the vertical synchronizing signal of the imaging element 5, the reset signal RS is sequentially supplied downward from the scanning lines in the area in which a plurality of pixels are arranged to the imaging element 5.

When the exposure time Tx elapses after the start of the supply of the reset signal RS and the vertical synchronizing signal of the imaging element 5 falls, the read signal RE is sequentially supplied downward from the scanning lines in the area in which a plurality of pixels are arranged to the imaging element 5. The above-mentioned operation is repeated.

The exposure time of each pixel is controlled to be the exposure time Tx by the above-mentioned driving operation. The exposure time Tx corresponds to the above-mentioned shutter speed.

The electric control system of the digital camera further comprises an analog signal processing unit 6 that is connected to the output of the imaging element 5 and performs analog signal processing, such as a correlated double sampling process, and an analog/digital conversion circuit 7 that converts an analog signal output from the analog signal processing unit 6 into a digital signal. The analog signal processing unit 6 and the analog/digital conversion circuit 7 are controlled by the system control unit 11.

In addition, the electric control system of the digital camera comprises a main memory 16, a memory control unit 15 that is connected to the main memory 16, a digital signal processing unit 17 that performs, for example, an interpolation operation, a gamma correction operation, and a color conversion process for the captured image signal output from the analog/digital conversion circuit 7 to generate captured image data, a compression and decompression processing unit 18 that compresses the captured image data generated by the digital signal processing unit 17 in a Joint Photographic Experts Group (JPEG) format or decompresses the compressed image data, a flicker detection unit 20, an external memory control unit 21 to which a detachable recording medium 22 is connected, and a display control unit 23 to which a display unit 24 mounted on, for example, the rear surface of the camera is connected.

The memory control unit 15, the digital signal processing unit 17, the compression and decompression processing unit 18, the flicker detection unit 20, the external memory control unit 21, and the display control unit 23 are connected to each other by a control bus 25 and a data bus 26 and are operated by commands from the system control unit 11.

The flicker detection unit 20 detects whether a 50-Hz flicker is present and whether a 60-Hz flicker is present, on the basis of a first captured image signal that is obtained by an imaging operation at a first frame rate and a captured image signal that is obtained by an imaging operation at the second frame rate.

Specifically, the flicker detection unit 20 detects whether a 50-Hz flicker is present and whether a 60-Hz flicker is present, on the basis of a first coincidence between a set of the first captured image signals or a set of the second captured image signals and a second coincidence between the first captured image signal obtained by an imaging operation at the first frame rate and the second captured image signal obtained by an imaging operation at the second frame rate following the imaging operation at the first frame rate.

An imaging operation at an arbitrary frame rate means an imaging operation for the frame period based on the frame rate.

Next, the flicker detection operation of the digital camera illustrated in FIG. 1 will be described with reference to a flowchart.

Figure 3:
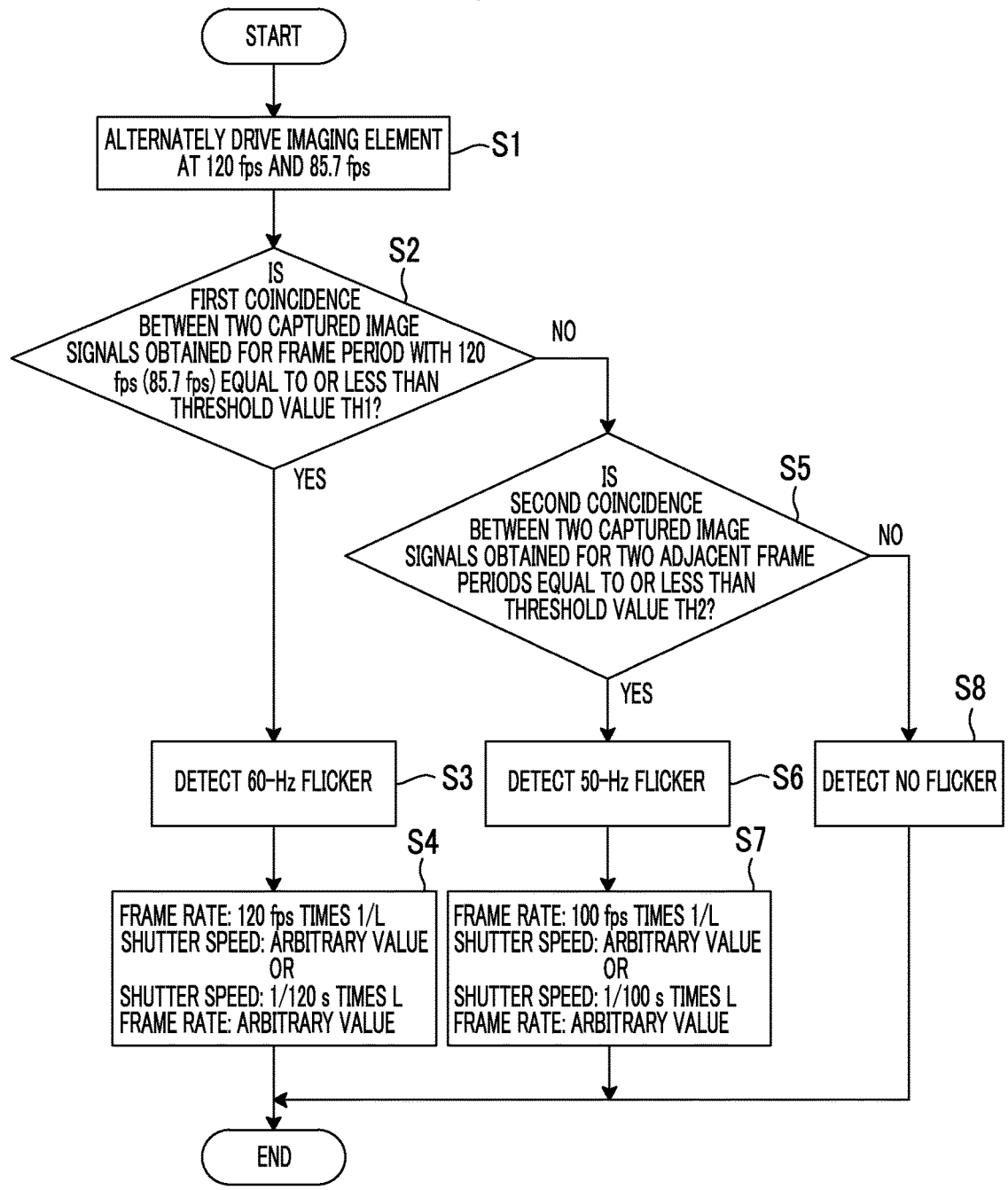
FIG. 3 is a flowchart illustrating a first example of a flicker detection operation of the digital camera illustrated in FIG. 1.

FIG. 3 is a flowchart illustrating a first example of the flicker detection operation of the digital camera illustrated in FIG. 1. The process illustrated in FIG. 3 is performed, for example, at a regular interval or is performed in a case in which there is a large change in an imaging scene (for example, in a case in which there is a large change in brightness).

In the first example, each of the first frame rate and the second frame rate is set such that the sum of the duration of the first frame period based on the first frame rate and the duration of the second frame period based on the second frame rate is $1/50$ seconds that is obtained by multiplying the reciprocal of the first frequency (100 Hz) by a natural number (=2). Specifically, the first frame rate is set to 85.7 fps and the second frame rate is set to 120 fps.

When the flicker detection operation starts, the system control unit 11 sets the first frame rate to 85.7 fps, sets the second frame rate to 120 fps, and alternately drives the imaging element 5 at a frame rate of 120 fps and a frame rate of 85.7 fps (Step S1).

Figure 4:
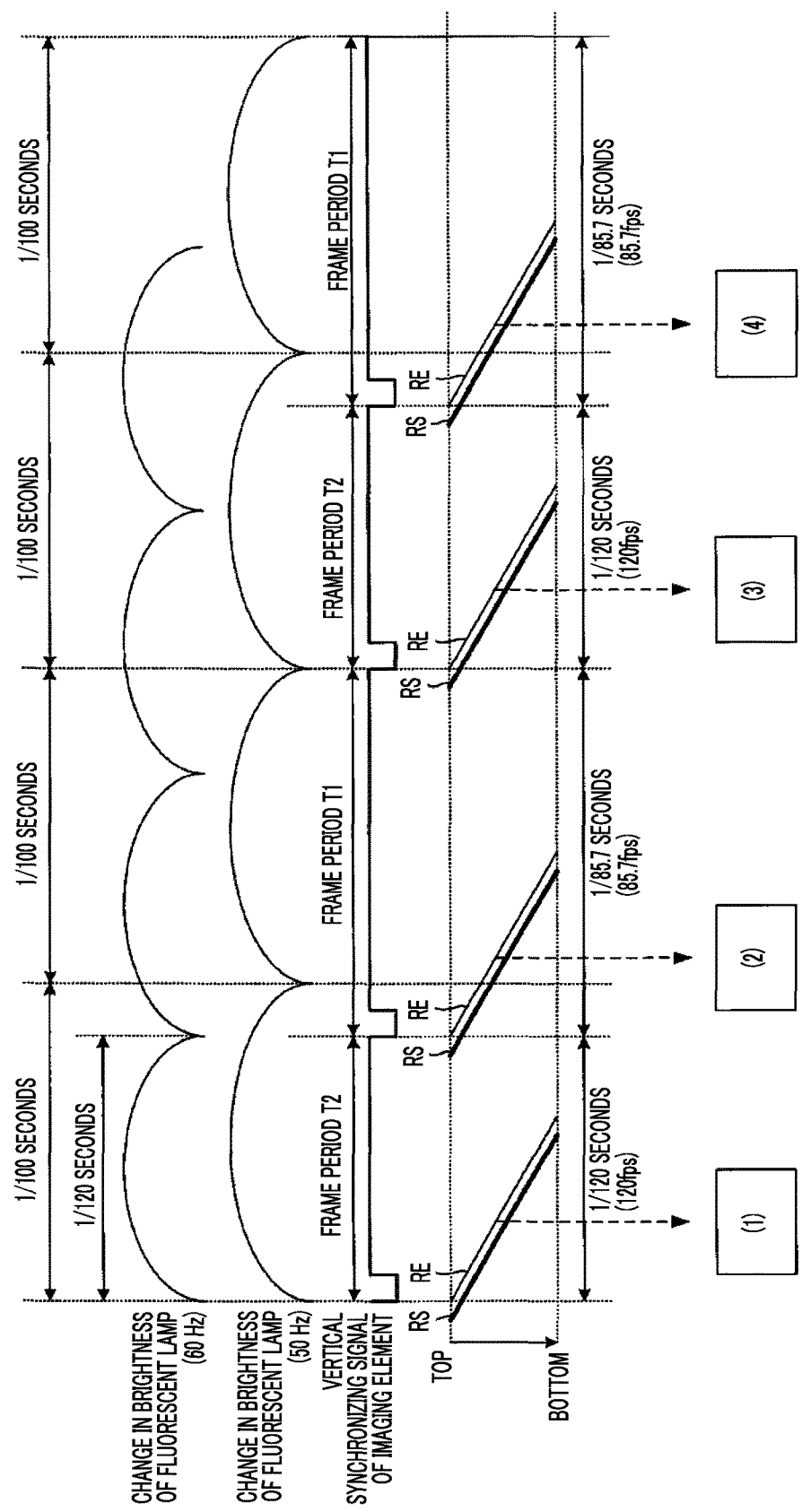
FIG. 4 is a timing chart illustrating driving started in Step S1 of FIG. 3.

FIG. 4 is a timing chart illustrating the driving started in Step S1. FIG. 4 illustrates a change in the brightness of a fluorescent lamp that is operated by a power supply with a frequency of 60 Hz and a change in the brightness of a fluorescent lamp that is operated by a power supply with a frequency of 50 Hz together with the timing chart.

As illustrated in FIG. 4, in Step S1, the imaging element 5 is alternately driven for a frame period T2 of $1/120$ seconds and a frame period T1 of 1/85.7 seconds.

A value based on appropriate exposure that is determined on the basis of the captured image signal output from the imaging element 5 is set as the exposure time (shutter speed) in each frame period.

In FIG. 4, a captured image signal obtained by an imaging operation (the reading of a signal from the pixels by the read signal RE) for the first frame period T2 is referred to as a captured image signal (1). In FIG. 4, a captured image signal obtained by an imaging operation for the frame period T1 following the first frame period T2 is referred to as a captured image signal (2).

In FIG. 4, a captured image signal obtained by an imaging operation for the frame period T2 following the first frame period T1 is referred to as a captured image signal (3). In FIG. 4, a captured image signal obtained by an imaging operation for the frame period T1 following the second frame period T2 is referred to as a captured image signal (4).

Returning to FIG. 3, after Step S1, the flicker detection unit 20 determines whether the first coincidence between a set of the captured image signals ((1) and (3) in FIG. 4) obtained by the imaging operation at the second frame rate or a set of the captured image signals ((2) and (4) in FIG. 4) obtained by the imaging operation at the first frame rate is equal to or less than a threshold value TH1 (Step S2).

The flicker detection unit 20 divides each of two captured image signals, between which the coincidence is to be determined, into a plurality of blocks in the direction in which the scanning lines are arranged and calculates the brightness average (or the chroma average) of the pixel signals in each block. Then, the flicker detection unit 20 calculates the difference between the brightness averages (chroma averages) of the same blocks and uses the average value of the differences as the coincidence between two captured image signals.

The coincidence may be an index that can determine whether two captured image signals are substantially the same. However, the coincidence is not limited to this example.

The captured image signal (1) and the captured image signal (3) are acquired at an interval of about $1/50$ seconds which is the sum of the duration of the frame period T2 and the duration of the frame period T1. The sum is a value other than a natural number multiple of $1/120$ seconds.

Therefore, in a case in which a 60-Hz flicker has occurred, there is a large difference between the captured image signal (1) and the captured image signal (3) and the first coincidence is equal to or less than the threshold value TH1. In a case in which a 50-Hz flicker has occurred, since the sum is a natural number multiple of $1/100$ seconds, the captured image signal (1) and the captured image signal (3) are substantially the same and the first coincidence is greater than the threshold value TH1.

Similarly, the captured image signal (2) and the captured image signal (4) are acquired at an interval of about $1/50$ seconds which is the sum of the duration of the frame period T1 and the duration of the frame period T2. The sum is a value other than a natural number multiple of $1/120$ seconds.

Therefore, in a case in which a 60-Hz flicker has occurred, there is a large difference between the captured image signal (2) and the captured image signal (4) and the first coincidence is equal to or less than the threshold value TH1. In a case in which a 50-Hz flicker has occurred, since the sum is a natural number multiple of $1/100$ seconds, the captured image signal (2) and the captured image signal (4) are substantially the same and the first coincidence is greater than the threshold value TH1.

Therefore, when the determination result in Step S2 is "YES", the flicker detection unit 20 detects that a 60-Hz flicker has occurred (Step S3).

After Step S3, the system control unit 11 sets the frame rate to a value obtained by multiplying 120 fps by 1/L and sets the shutter speed to an arbitrary value based on appropriate exposure. Alternatively, the system control unit 11 sets the frame rate to an arbitrary value and sets the shutter speed to a value obtained by multiplying 1/120 seconds by L (Step S4).

Then, the system control unit 11 directs the imaging element driving unit 10 to drive the imaging element 5 under this set condition and ends the process.

In a state in which a 50-Hz flicker has occurred or in a state in which no flicker has occurred, the determination result in Step S2 is "NO".

Therefore, when the determination result in Step S2 is "NO", the flicker detection unit 20 determines whether a 50-Hz flicker has occurred or whether no flicker has occurred.

Specifically, in Step S5, the flicker detection unit 20 determines whether the second coincidence between two captured image signals ((2) and (3) in FIG. 4) obtained for the frame period T1 with a frame rate of 85.7 fps and the frame period T2 with a frame rate of 120 fps following the frame period T1 or the second coincidence between two captured image signals ((3) and (4) in FIG. 4) obtained for the frame period T2 with a frame rate of 120 fps and the frame period T1 with a frame rate of 85.7 fps following the frame period T2 is equal to or less than a threshold value TH2.

The captured image signal (2) and the captured image signal (3) are acquired at an interval of 1/85.7 seconds which is the duration of the frame period T1.

In the first example, the duration of the frame period T1 is different from the duration of the frame period T2 and the sum of the duration of the frame period T1 and the duration of the frame period T2 is a natural number multiple of 1/100 seconds. Therefore, the duration of the frame period T1 is inevitably a value other than a natural number multiple of 1/100 seconds.

Therefore, in a case in which a 50-Hz flicker has occurred, there is a large difference between the captured image signal (2) and the captured image signal (3) and the second coincidence is equal to or less than the threshold value TH2.

The captured image signal (3) and the captured image signal (4) are acquired at an interval of 1/120 seconds which is the duration of the frame period T2.

In the first example, the duration of the frame period T1 is different from the duration of the frame period T2 and the sum of the duration of the frame period T1 and the duration of the frame period T2 is a natural number multiple of 1/100 seconds. Therefore, the duration of the frame period T2 is also inevitably a value other than a natural number multiple of 1/100 seconds.

Therefore, in a case in which a 50-Hz flicker has occurred, there is a large difference between the captured image signal (3) and the captured image signal (4) and the second coincidence is equal to or less than the threshold value TH2.

Therefore, when the determination result in Step S5 is "YES", the flicker detection unit 20 detects that a 50-Hz flicker has occurred (Step S6). When the determination result in Step S5 is "NO", the flicker detection unit 20 detects that no flicker has occurred (Step S8).

After Step S6, the system control unit 11 sets the frame rate to a value obtained by multiplying 100 fps by 1/L and sets the shutter speed to an arbitrary value based on appropriate exposure. Alternatively, the system control unit 11 sets the frame rate to an arbitrary value and sets the shutter speed to a value obtained by multiplying 1/100 seconds by L (Step S7).

Then, the system control unit 11 directs the imaging element driving unit 10 to drive the imaging element 5 under this set condition and ends the process.

As described above, according to the digital camera illustrated in FIG. 1, it is possible to detect whether a 50-Hz flicker and a 60-Hz flicker are present, on the basis of the first coincidence between a set of the captured image signals obtained for the frame period T1 or the frame period T2 and the second coincidence between a set of the captured image signals obtained for the frame period T1 and the frame period T2 which are adjacent to each other.

As a result, it is possible to distinguish and detect the flickers of light sources with different frequencies, using a simple process of only changing the frame rate, without changing the exposure time. Therefore, it is possible to perform driving for preventing the deterioration of image quality due to the detected flicker, according to the frequency of the detected flicker, and to improve imaging quality.

According to the digital camera illustrated in FIG. 1, two periods of the vertical synchronizing signal of the imaging element 5 is a natural number multiple of 1/100 seconds. Therefore, when the display frame rate of the display unit 24 is set to a value obtained by dividing 100 fps by a natural number, it is possible to perform the process illustrated in FIG. 3 while fixing the display frame rate. Therefore, even in a case in which a live view image is displayed, it is possible to detect a flicker, without affecting display quality.

Figure 5:
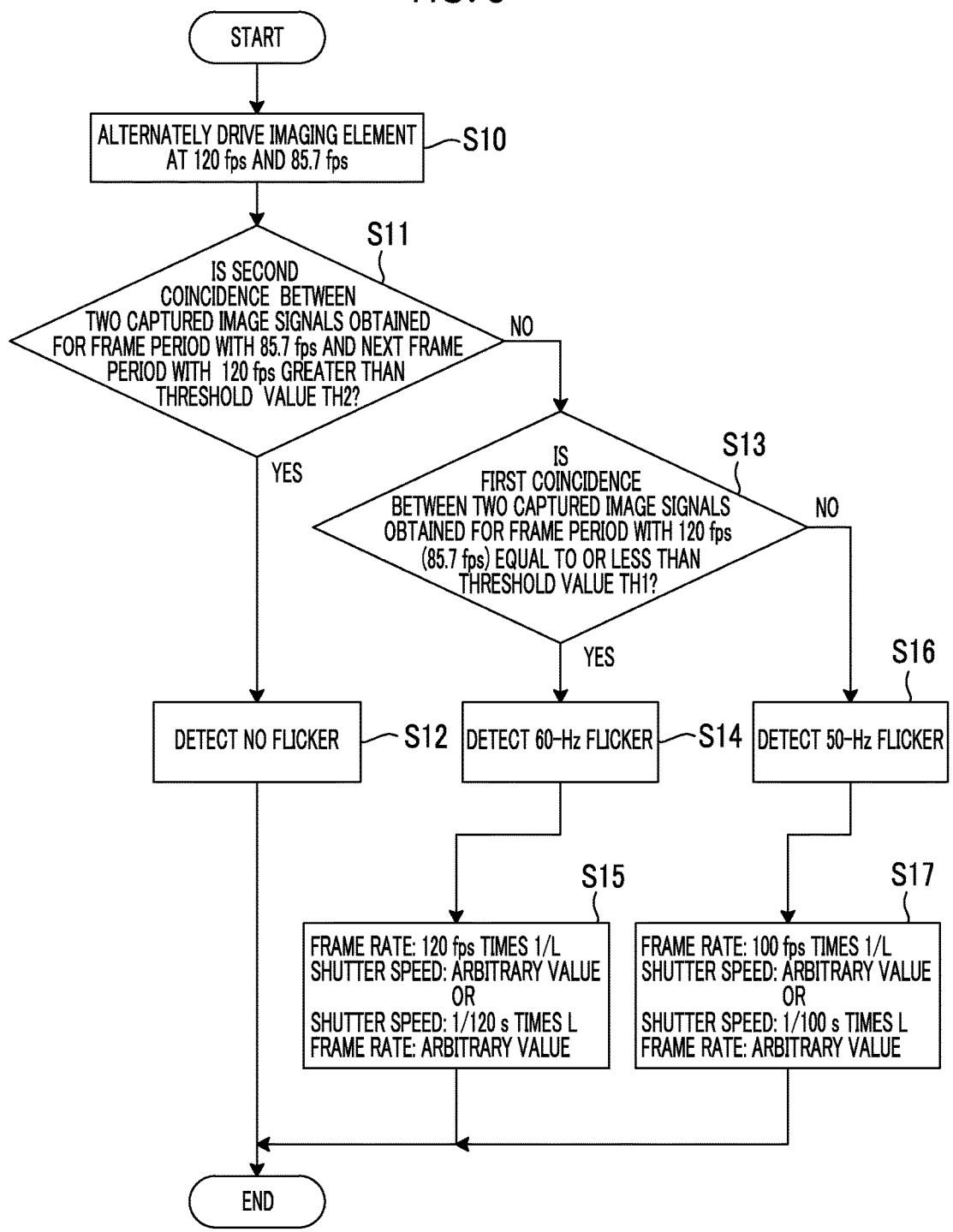
FIG. 5 is a flowchart illustrating a second example of the flicker detection operation of the digital camera illustrated in FIG. 1.

FIG. 5 is a flowchart illustrating a second example of the flicker detection operation of the digital camera illustrated in FIG. 1.

In the second example, each of the first frame rate and the second frame rate is set such that the sum of the duration of the first frame period based on the first frame rate and the duration of the second frame period based on the second frame rate is 1/50 seconds that is obtained by multiplying the reciprocal of the first frequency (100 Hz) by a natural number (=2) and the first frame rate is set to a value other than the value obtained by dividing the second frequency (120 Hz) by a natural number. Specifically, similarly to the first example, the first frame rate is set to 85.7 fps and the second frame rate is set to 120 fps.

When the flicker detection operation starts, the system control unit 11 sets the first frame rate to 85.7 fps, sets the second frame rate to 120 fps, and alternately drives the imaging element 5 at a frame rate of 85.7 fps and a frame rate of 120 fps (Step S10).

Then, the flicker detection unit 20 determines whether the second coincidence between two captured image signals ((2) and (3) in FIG. 4) obtained for the frame period T1 with a frame rate of 85.7 fps and the frame period T2 with a frame rate of 120 fps following the frame period T1 is greater than the threshold value TH2 (Step S11).

The captured image signal (2) and the captured image signal (3) are acquired at an interval of 1/85.7 seconds which is the duration of the frame period T1. In the second example, the duration of the frame period T1 is a value other than a natural number multiple of 1/100 seconds and a natural number multiple of 1/120 seconds.

Therefore, in a case in which one of a 50-Hz flicker and a 60-Hz flicker has occurred, there is a large difference between the captured image signal (2) and the captured image signal (3) and the second coincidence is equal to or less than the threshold value TH2. That is, only in a case in which no flicker has occurred, the captured image signal (2) and the captured image signal (3) are substantially the same and the second coincidence is greater than the threshold value TH2.

Therefore, when the determination result in Step S11 is "YES", the flicker detection unit 20 detects that there is no flicker (Step S12) and ends the process.

When the determination result in Step S11 is "NO", the flicker detection unit 20 determines whether the first coincidence between a set of the captured image signals ((1) and (3) in FIG. 4) obtained for the frame period T2 with a frame rate of 120 fps or a set of the captured image signals ((2) and (4) in FIG. 4) obtained for the frame period T1 with a frame rate of 85.7 fps is equal to or less than the threshold value TH1 (Step S13).

The captured image signal (1) and the captured image signal (3) are acquired at an interval of about $\frac{1}{50}$ seconds. Therefore, in a case in which a 60-Hz flicker has occurred, there is a large difference between the captured image signal (1) and the captured image signal (3) and the first coincidence is equal to or less than the threshold value TH1.

In contrast, in a case in which a 50-Hz flicker has occurred, the captured image signal (1) and the captured image signal (3) are substantially the same and the first coincidence is greater than the threshold value TH1.

Similarly, the captured image signal (2) and the captured image signal (4) are acquired at an interval of about $\frac{1}{50}$ seconds. Therefore, in a case in which a 60-Hz flicker has occurred, there is a large difference between the captured image signal (2) and the captured image signal (4) and the first coincidence is equal to or less than the threshold value TH1.

In contrast, in a case in which a 50-Hz flicker has occurred, the captured image signal (2) and the captured image signal (4) are substantially the same and the first coincidence is greater than the threshold value TH1.

Therefore, when the determination result in Step S13 is "YES", the flicker detection unit 20 detects that a 60-Hz flicker has occurred (Step S14). When the determination result in Step S13 is "NO", the flicker detection unit 20 detects that a 50-Hz flicker has occurred (Step S16).

After Step S14, the system control unit 11 sets the frame rate to a value obtained by multiplying 120 fps by 1/L and sets the shutter speed to an arbitrary value based on appropriate exposure. Alternatively, the system control unit 11 sets the frame rate to an arbitrary value and sets the shutter speed to a value obtained by multiplying $\frac{1}{120}$ seconds by L (Step S15).

After Step S16, the system control unit 11 sets the frame rate to a value obtained by multiplying 100 fps by 1/L and sets the shutter speed to an arbitrary value based on appropriate exposure. Alternatively, the system control unit 11 sets the frame rate to an arbitrary value and sets the shutter speed to a value obtained by multiplying $\frac{1}{100}$ seconds by L (Step S17).

As described above, in the second example, the flicker detection unit 20 determines the second coincidence between two captured image signals ((2) and (3) in FIG. 4) obtained for the frame period T1 and the frame period T2 following the frame period T1 and determines whether a flicker is present.

Then, in a case in which it is determined that a flicker is present, the flicker detection unit 20 detects whether a 50-Hz flicker has occurred or whether a 60-Hz flicker has occurred, on the basis of the first coincidence between a set of the captured image signals obtained for the frame period T1 or the frame period T2.

According to the second example, when there is no flicker, the coincidence can be determined by one operation. In a use scene of the digital camera, it is considered that a flicker does not occur in many situations. Therefore, the use of the process flow illustrated in FIG. 5 makes it possible to reduce the amount of calculation.

Figure 6:
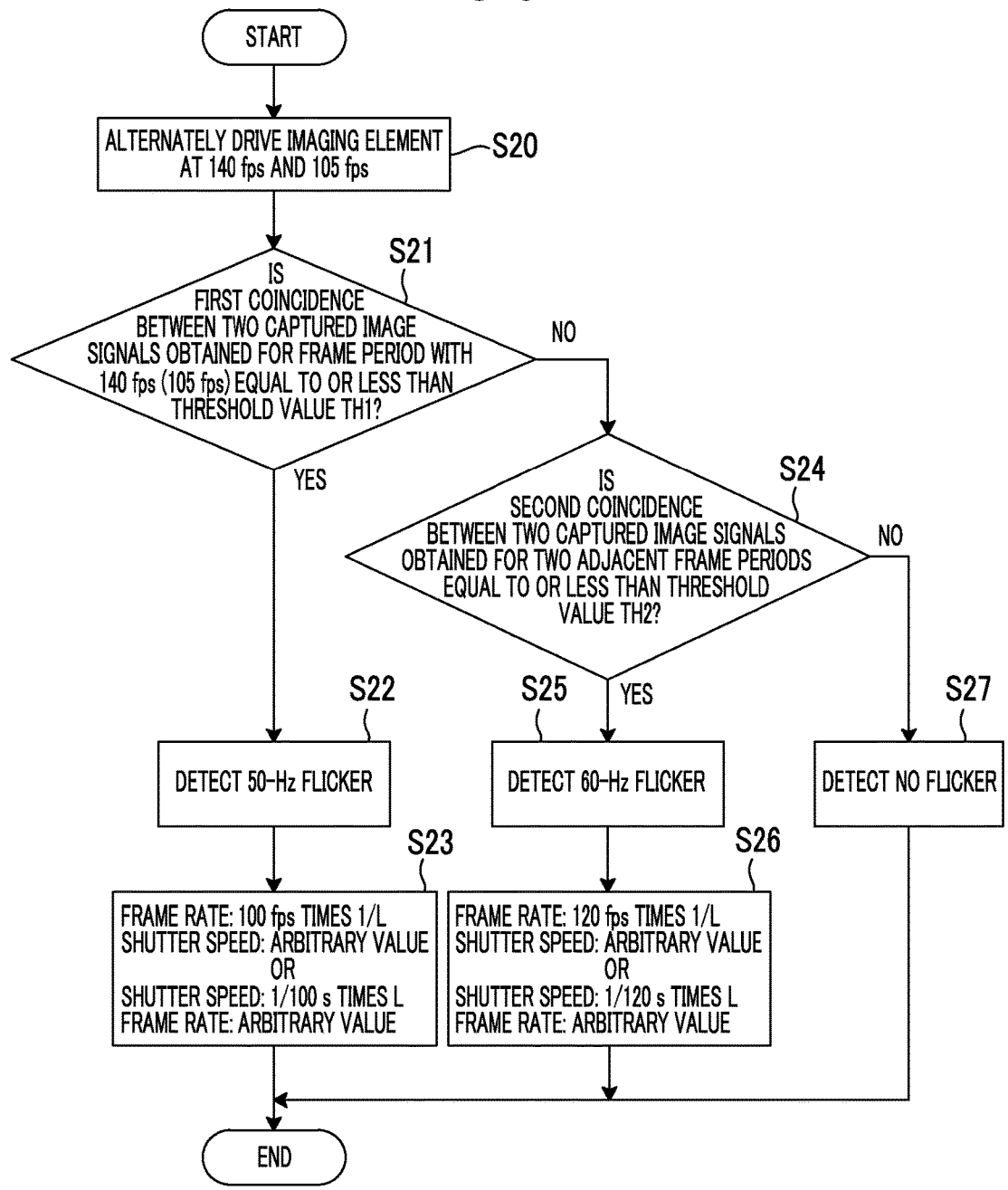
FIG. 6 is a flowchart illustrating a third example of the flicker detection operation of the digital camera illustrated in FIG. 1.

FIG. 6 is a flowchart illustrating a third example of the flicker detection operation of the digital camera illustrated in FIG. 1.

In the third example, each of the first frame rate and the second frame rate is set such that the sum of the duration of the first frame period based on the first frame rate and the duration of the second frame period based on the second frame rate is $\frac{1}{60}$ seconds that is obtained by multiplying the reciprocal of the second frequency (120 Hz) by a natural number. Specifically, the first frame rate is set to 105 fps and the second frame rate is set to 140 fps.

When the flicker detection operation starts, the system control unit 11 sets the first frame rate to 105 fps, sets the second frame rate to 140 fps, and alternately drives the imaging element 5 at a frame rate of 105 fps and a frame rate of 140 fps (Step S20).

Figure 7:
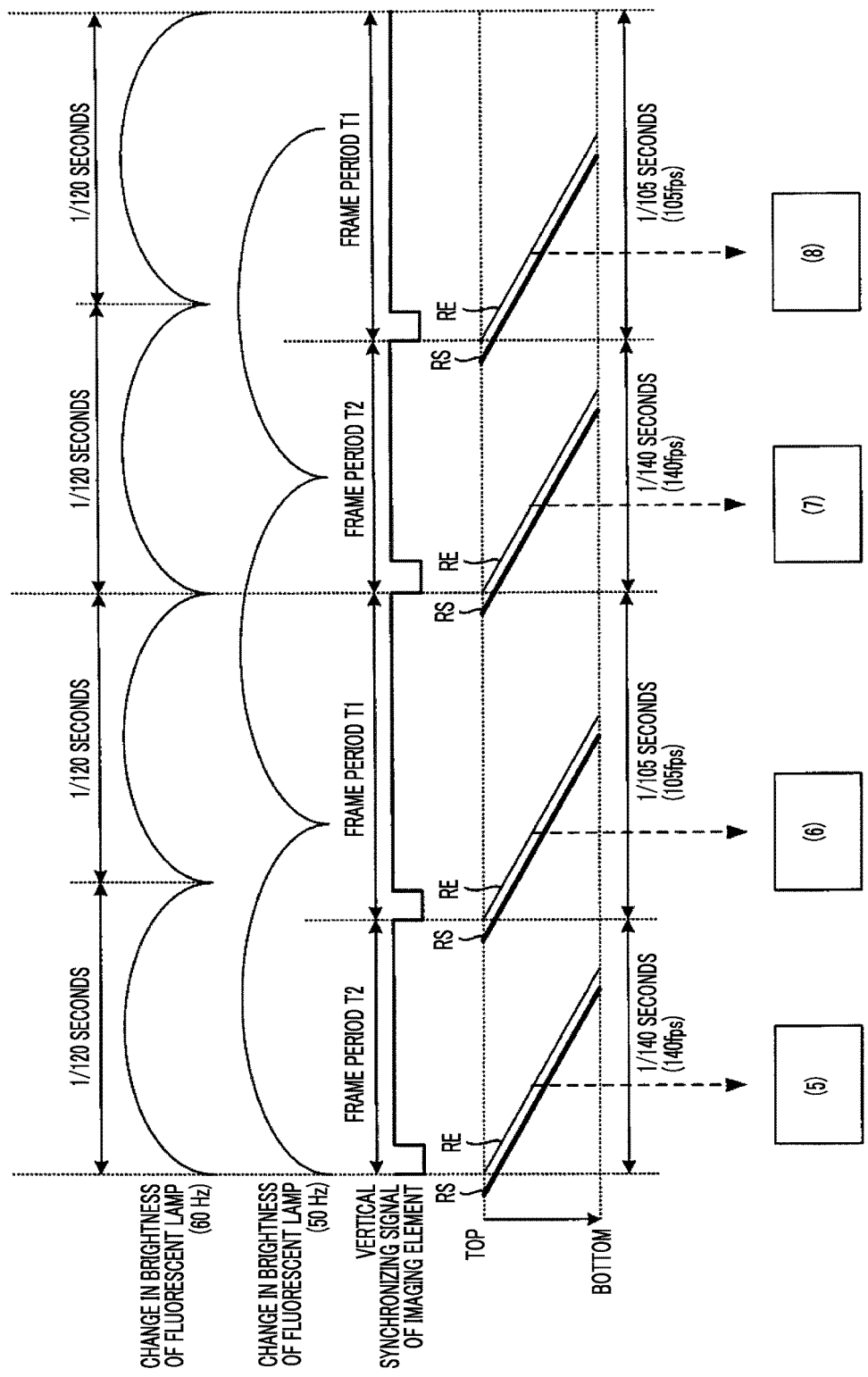
FIG. 7 is a timing chart illustrating driving started in Step S20 of FIG. 6.

FIG. 7 is a timing chart illustrating the driving started in Step S20. FIG. 7 illustrates a change in the brightness of a fluorescent lamp that is operated by a power supply with a frequency of 60 Hz and a change in the brightness of a fluorescent lamp that is operated by a power supply with a frequency of 50 Hz together with the timing chart.

As illustrated in FIG. 7, in Step S20, the imaging element 5 is alternately driven for a frame period T2 of $\frac{1}{140}$ seconds and a frame period T1 of $\frac{1}{105}$ seconds.

A value based on appropriate exposure that is determined on the basis of the captured image signal output from the imaging element 5 is set as the exposure time (shutter speed) in each frame period.

In FIG. 7, a captured image signal obtained by an imaging operation for the first frame period T2 is referred to as a captured image signal (5). In FIG. 7, a captured image signal obtained by an imaging operation for the frame period T1 following the first frame period T2 is referred to as a captured image signal (6).

In FIG. 7, a captured image signal obtained by an imaging operation for the frame period T2 following the first frame period T1 is referred to as a captured image signal (7). In FIG. 7, a captured image signal obtained by an imaging operation for the frame period T1 following the second frame period T2 is referred to as a captured image signal (8).

Returning to FIG. 6, after Step S20, the flicker detection unit 20 determines whether the first coincidence between a set of the captured image signals ((5) and (7) in FIG. 7) obtained by an imaging operation at the second frame rate or a set of the captured image signals ((6) and (8) in FIG. 7) obtained by an imaging operation at the first frame rate is equal to or less than the threshold value TH1 (Step S21).

The captured image signal (5) and the captured image signal (7) are acquired at an interval of $\frac{1}{60}$ seconds which is the sum of the duration of the frame period T2 and the duration of the frame period T1. The sum is a natural number multiple of $\frac{1}{120}$ seconds.

Therefore, in a case in which a 50-Hz flicker has occurred, there is a large difference between the captured image signal (5) and the captured image signal (7) and the first coincidence is equal to or less than the threshold value TH1. In a case in which a 60-Hz flicker has occurred, since the sum is a natural number multiple of 1/120 seconds, the captured image signal (5) and the captured image signal (7) are substantially the same and the first coincidence is greater than the threshold value TH1.

Similarly, the captured image signal (6) and the captured image signal (8) are acquired at an interval of about 1/60 seconds which is the sum of the duration of the frame period T1 and the duration of the frame period T2. The sum is a natural number multiple of 1/120 seconds.

Therefore, in a case in which a 50-Hz flicker has occurred, there is a large difference between the captured image signal (6) and the captured image signal (8) and the first coincidence is equal to or less than the threshold value TH1. In a case in which a 60-Hz flicker has occurred, since the sum is a natural number multiple of 1/120 seconds, the captured image signal (6) and the captured image signal (8) are substantially the same and the first coincidence is greater than the threshold value TH1.

Therefore, when the determination result in Step S21 is "YES", the flicker detection unit 20 detects that a 50-Hz flicker has occurred (Step S22).

After Step S22, the system control unit 11 sets the frame rate to a value obtained by multiplying 100 fps by 1/L and sets the shutter speed to an arbitrary value based on appropriate exposure. Alternatively, the system control unit 11 sets the frame rate to an arbitrary value and sets the shutter speed to a value obtained by multiplying 1/100 seconds by L (Step S23).

Then, the system control unit 11 directs the imaging element driving unit 10 to drive the imaging element 5 under this set condition and ends the process.

In a state in which a 60-Hz flicker has occurred or in a state in which no flicker has occurred, the determination result in Step S21 is "NO".

Therefore, when the determination result in Step S21 is "NO", the flicker detection unit 20 determines whether a 60-Hz flicker has occurred or whether no flicker has occurred.

Specifically, in Step S24, the flicker detection unit 20 determines whether the second coincidence between two captured image signals ((5) and (6) in FIG. 7) obtained for the frame period T2 with a frame rate of 140 fps and the frame period T1 with a frame rate of 105 fps following the frame period T2 or the second coincidence between two captured image signals ((6) and (7) in FIG. 7) obtained for the frame period T1 with a frame rate of 105 fps and the frame period T2 with a frame rate of 140 fps following the frame period T1 is equal to or less than the threshold value TH2.

The captured image signal (5) and the captured image signal (6) are acquired at an interval of 1/140 seconds which is the duration of the frame period T2.

In the third example, the duration of the frame period T1 is different from the duration of the frame period T2 and the sum of the duration of the frame period T1 and the duration of the frame period T2 is a natural number multiple of 1/120 seconds. Therefore, the duration of the frame period T2 is also inevitably a value other than a natural number multiple of 1/120 seconds.

Therefore, in a case in which a 60-Hz flicker has occurred, there is a large difference between the captured image signal (5) and the captured image signal (6) and the second coincidence is equal to or less than the threshold value TH2.

The captured image signal (6) and the captured image signal (7) are acquired at an interval of 1/105 seconds which is the duration of the frame period T1.

In the third example, the duration of the frame period T1 is different from the duration of the frame period T2 and the sum of the duration of the frame period T1 and the duration of the frame period T2 is a natural number multiple of 1/120 seconds. Therefore, the duration of the frame period T1 is inevitably a value other than a natural number multiple of 1/120 seconds.

Therefore, in a case in which a 60-Hz flicker has occurred, there is a large difference between the captured image signal (6) and the captured image signal (7) and the second coincidence is equal to or less than the threshold value TH2.

Therefore, when the determination result in Step S24 is "YES", the flicker detection unit 20 detects that a 60-Hz flicker has occurred (Step S25). When the determination result in Step S24 is "NO", the flicker detection unit 20 detects that no flicker has occurred (Step S27).

After Step S25, the system control unit 11 sets the frame rate to a value obtained by multiplying 120 fps by 1/L and sets the shutter speed to an arbitrary value based on appropriate exposure. Alternatively, the system control unit 11 sets the frame rate to an arbitrary value and sets the shutter speed to a value obtained by multiplying 1/120 seconds by L (Step S26).

Then, the system control unit 11 directs the imaging element driving unit 10 to drive the imaging element 5 under this set condition and ends the process.

As described above, according to the third example, it is possible to detect whether a 50-Hz flicker and a 60-Hz flicker are present, on the basis of the first coincidence between a set of the captured image signals obtained for the frame period T1 or the frame period T2 and the second coincidence between a set of the captured image signals obtained for the frame period T1 and the frame period T2 which are adjacent to each other.

As a result, it is possible to distinguish and detect the flickers of light sources with different frequencies, using a simple process of only changing the frame rate, without changing the exposure time. Therefore, it is possible to perform driving for preventing the deterioration of image quality due to the detected flicker, according to the frequency of the detected flicker, and to improve imaging quality.

According to the digital camera illustrated in FIG. 1, two periods of the vertical synchronizing signal of the imaging element 5 is a natural number multiple of 1/120 seconds. Therefore, when the display frame rate of the display unit 24 is set to a value obtained by dividing 120 fps by a natural number, it is possible to perform the process illustrated in FIG. 6 while fixing the display frame rate. Therefore, even in a case in which a live view image is displayed, it is possible to detect a flicker, without affecting display quality.

Figure 8:
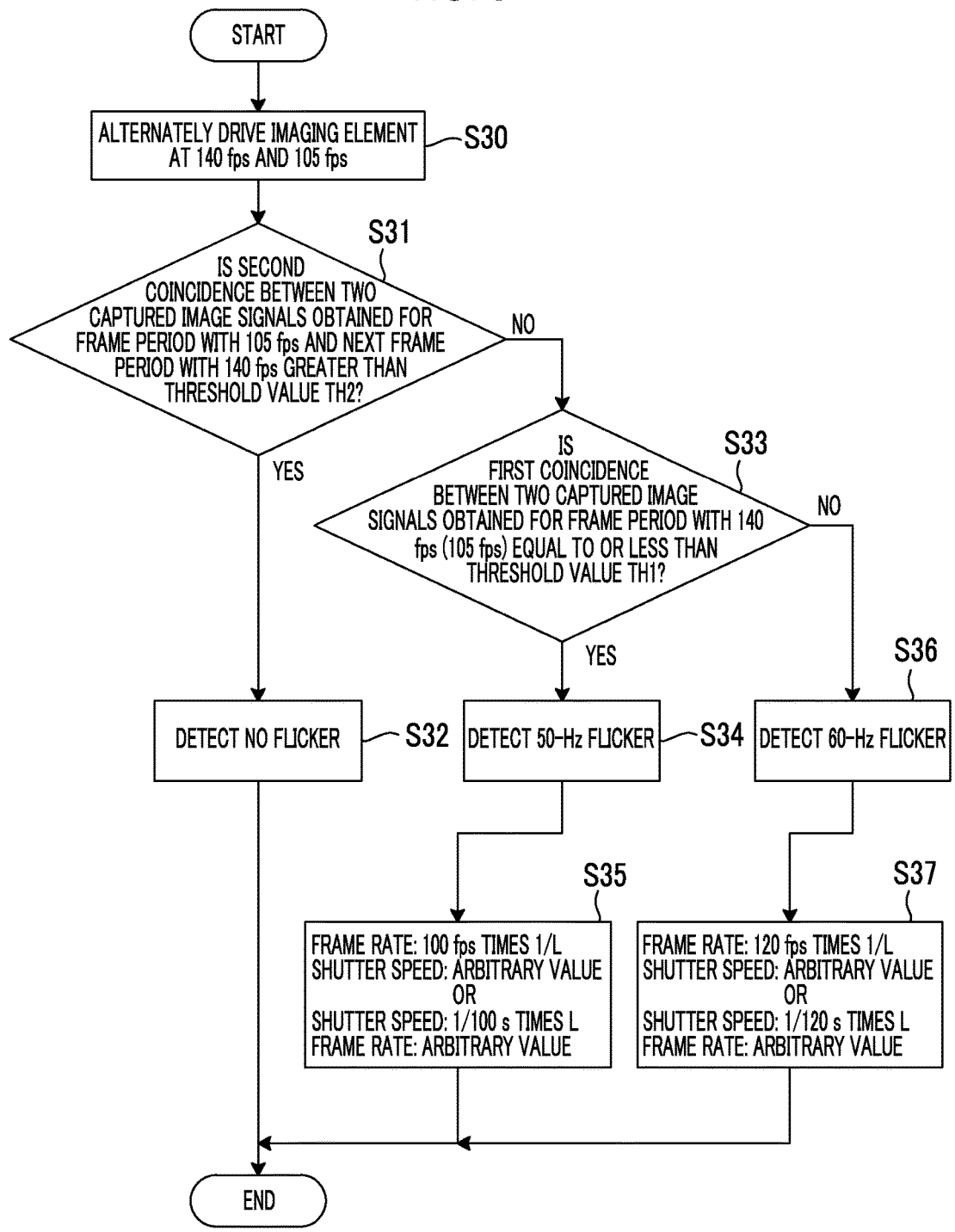
FIG. 8 is a flowchart illustrating a fourth example of the flicker detection operation of the digital camera illustrated in FIG. 1.

FIG. 8 is a flowchart illustrating a fourth example of the flicker detection operation of the digital camera illustrated in FIG. 1.

In the fourth example, each of the first frame rate and the second frame rate is set such that the sum of the duration of the first frame period based on the first frame rate and the duration of the second frame period based on the second frame rate is 1/60 seconds that is obtained by multiplying the reciprocal of the second frequency (120 Hz) by a natural number and the first frame rate is set to a value other than the value obtained by dividing the first frequency (100 Hz) by a natural number. Specifically, similarly to the third example, the first frame rate is set to 105 fps and the second frame rate is set to 140 fps.

When the flicker detection operation starts, the system control unit 11 sets the first frame rate to 105 fps, sets the second frame rate to 140 fps, and alternately drives the imaging element 5 at a frame rate of 105 fps and a frame rate of 140 fps (Step S30).

Then, the flicker detection unit 20 determines whether the second coincidence between two captured image signals ((6) and (7) in FIG. 7) obtained for the frame period T1 with a frame rate of 105 fps and the frame period T2 with a frame rate of 140 fps following the frame period T1 is greater than the threshold value TH2 (Step S31).

The captured image signal (6) and the captured image signal (7) are acquired at an interval of $\frac{1}{105}$ seconds which is the duration of the frame period T1. In the fourth example, the duration of the frame period T1 is a value other than a natural number multiple of $\frac{1}{100}$ seconds and a natural number multiple of $\frac{1}{120}$ seconds.

Therefore, in a case in which one of a 50-Hz flicker and a 60-Hz flicker has occurred, there is a large difference between the captured image signal (6) and the captured image signal (7) and the second coincidence is equal to or less than the threshold value TH2. That is, only in a case in which no flicker has occurred, the captured image signal (6) and the captured image signal (7) are substantially the same and the second coincidence is greater than the threshold value TH2.

Therefore, when the determination result in Step S31 is "YES", the flicker detection unit 20 detects that there is no flicker (Step S32) and ends the process.

When the determination result in Step S31 is "NO", the flicker detection unit 20 determines whether the first coincidence between a set of the captured image signals ((5) and (7) in FIG. 7) obtained for the frame period T2 with a frame rate of 140 fps or a set of the captured image signals ((6) and (8) in FIG. 7) obtained for the frame period T1 with a frame rate of 105 fps is equal to or less than the threshold value TH1 (Step S33).

The captured image signal (5) and the captured image signal (7) are acquired at an interval of $\frac{1}{60}$ seconds. Therefore, in a case in which a 50-Hz flicker has occurred, there is a large difference between the captured image signal (5) and the captured image signal (7) and the first coincidence is equal to or less than the threshold value TH1.

In contrast, in a case in which a 60-Hz flicker has occurred, the captured image signal (5) and the captured image signal (7) are substantially the same and the first coincidence is greater than the threshold value TH1.

Similarly, the captured image signal (6) and the captured image signal (8) are acquired at an interval of $\frac{1}{60}$ seconds. Therefore, in a case in which a 50-Hz flicker has occurred, there is a large difference between the captured image signal (6) and the captured image signal (8) and the first coincidence is equal to or less than the threshold value TH1.

In contrast, in a case in which a 60-Hz flicker has occurred, the captured image signal (6) and the captured image signal (8) are substantially the same and the first coincidence is greater than the threshold value TH1.

Therefore, when the determination result in Step S33 is "YES", the flicker detection unit 20 detects that a 50-Hz flicker has occurred (Step S34). When the determination result in Step S33 is "NO", the flicker detection unit 20 detects that a 60-Hz flicker has occurred (Step S36).

After Step S34, the system control unit 11 sets the frame rate to a value obtained by multiplying 100 fps by 1/L and sets the shutter speed to an arbitrary value based on appropriate exposure. Alternatively, the system control unit 11 sets the frame rate to an arbitrary value and sets the shutter speed to a value obtained by multiplying $\frac{1}{100}$ seconds by L (Step S35).

After Step S36, the system control unit 11 sets the frame rate to a value obtained by multiplying 120 fps by 1/L and sets the shutter speed to an arbitrary value based on appropriate exposure. Alternatively, the system control unit 11 sets the frame rate to an arbitrary value and sets the shutter speed to a value obtained by multiplying $\frac{1}{120}$ seconds by L (Step S37).

As described above, in the fourth example, the flicker detection unit 20 determines the second coincidence between two captured image signals ((6) and (7) in FIG. 7) obtained for the frame period T1 and the frame period T2 following the frame period T1 and determines whether a flicker is present.

Then, in a case in which it is determined that a flicker is present, the flicker detection unit 20 detects whether a 50-Hz flicker has occurred or whether a 60-Hz flicker has occurred, on the basis of the first coincidence between a set of the captured image signals obtained for the frame period T1 or the frame period T2.

According to the fourth example, when there is no flicker, the coincidence can be determined by one operation. Therefore, it is possible to reduce the amount of calculation.

Next, the structure of a smart phone as an imaging apparatus will be described.

Figure 9:
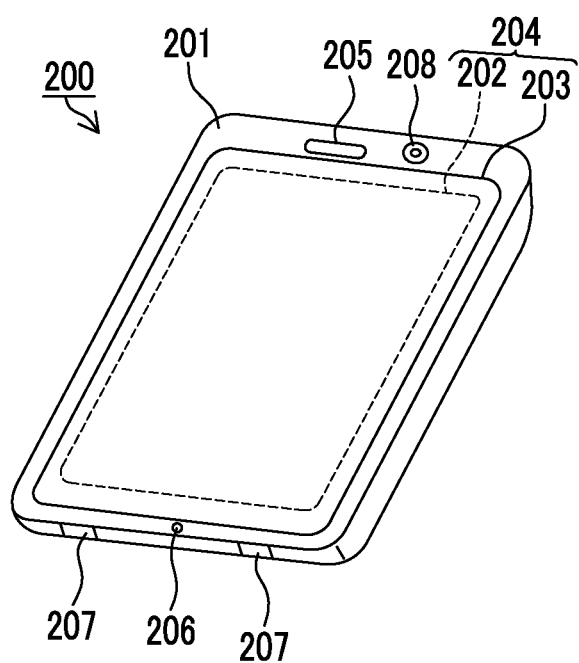
FIG. 9 is a diagram illustrating the external structure of a smart phone as the imaging apparatus.

FIG. 9 illustrates the outward appearance of a smart phone 200 which is an embodiment of the imaging apparatus according to the invention. The smart phone 200 illustrated in FIG. 9 includes a housing 201 with a flat panel shape. The smart phone 200 comprises a display input unit 204 having a display panel 202 as a display unit and an operation panel 203 as an input unit which are integrally formed on one surface of the housing 201.

The housing 201 comprises a speaker 205, a microphone 206, an operation unit 207, and a camera unit 208. However, the configuration of the housing 201 is not limited thereto. For example, the display unit and the input unit may be independently provided or the housing 201 may have a folding structure or a sliding structure.

Figure 10:
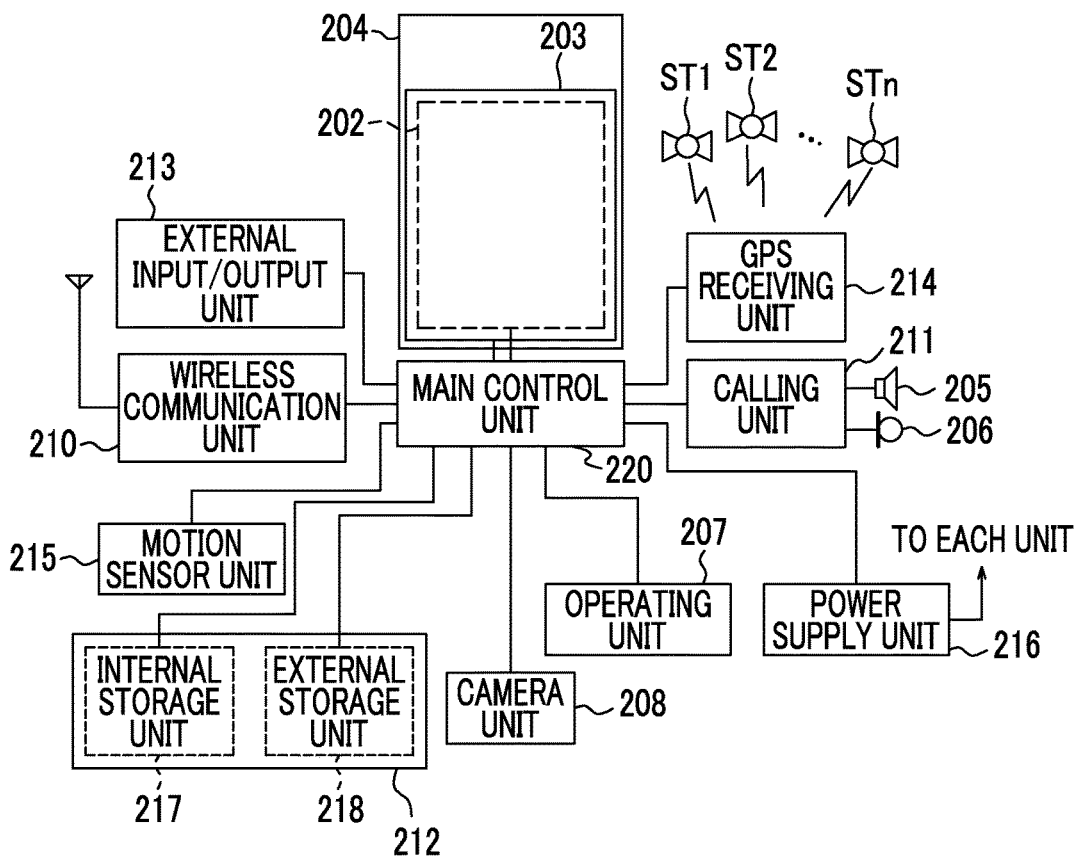
FIG. 10 is a diagram illustrating the internal structure of the smart phone illustrated in FIG. 9.

FIG. 10 is a block diagram illustrating the structure of the smart phone 200 illustrated in FIG. 9.

As illustrated in FIG. 10, the smart phone 200 comprises, as main components, a wireless communication unit 210, the display input unit 204, a calling unit 211, the operation unit 207, the camera unit 208, a storage unit 212, an external input/output unit 213, a global positioning system (GPS) receiving unit 214, a motion sensor unit 215, a power supply unit 216, and a main control unit 220. In addition, the smart phone 200 has, as a main function, a wireless communication function which performs mobile wireless communication through a base station apparatus (not illustrated) and a mobile communication network (not illustrated).

The wireless communication unit 210 performs wireless communication with the base station apparatus which is accommodated in the mobile communication network in response to a command from the main control unit 220. The wireless communication is used to transmit and receive various types of file data, such as voice data and image data, and electronic mail data or to receive, for example, web data or streaming data.

The display input unit 204 is a so-called touch panel that displays, for example, images (still images and motion pictures) or text information to visually transmit information to the user and detects the user's operation for the displayed information under the control of the main control unit 220 and comprises the display panel 202 and the operation panel 203.

The display panel 202 uses, for example, a liquid crystal display (LCD) or an organic electro-luminescence display (OELD) as a display device.

The operation panel 203 is a device that is provided such that an image displayed on a display surface of the display panel 202 can be visually recognized and detects one or a plurality of coordinate points operated by a finger of the user or a stylus. When the device is operated by a finger of the user or a stylus, a detection signal which is generated by the operation is output to the main control unit 220. Then, the main control unit 220 detects an operation position (coordinates) on the display panel 202 on the basis of the received detection signal.

As illustrated in FIG. 10, the display panel 202 and the operation panel 203 of the smart phone 200 that is exemplified as an embodiment of the imaging apparatus according to the invention are integrated to form the display input unit 204 and the operation panel 203 is provided so as to completely cover the display panel 202.

In a case in which this structure is used, the operation panel 203 may have a function of detecting the user's operation even in a region other than the display panel 202. In other words, the operation panel 203 may comprise a detection region (hereinafter, referred to as a display region) for an overlap portion which overlaps the display panel 202 and a detection region (hereinafter, referred to as a non-display region) for an outer edge portion which does not overlap the display panel 202.

The size of the display region may be exactly equal to the size of the display panel 202. However, the sizes are not necessarily equal to each other. The operation panel 203 may comprise two sensitive regions, that is, an outer edge portion and an inner portion other than the outer edge portion. The width of the outer edge portion is appropriately designed according to, for example, the size of the housing 201. Examples of a position detection method which is used in the operation panel 203 include a matrix switching method, a resistive film method, a surface elastic wave method, an infrared method, an electromagnetic induction method, and a capacitive sensing method. Any of the methods may be used.

The calling unit 211 comprises the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205.

As illustrated in FIG. 9, for example, the speaker 205 can be mounted on the same surface as the display input unit 204 and the microphone 206 can be mounted on the side surface of the housing 201.

The operation unit 207 is a hardware key which uses, for example, a key switch and receives commands from the user. For example, as illustrated in FIG. 9, the operation unit 207 is a push button switch which is mounted on the side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has a slot for a detachable external memory. The internal storage unit 217 and the external storage unit 218 forming the storage unit 212 may be implemented by a storage medium, such as a flash memory, a hard disk, a multimedia-card-micro-type memory, a card-type memory, a random access memory (RAM), or a read only memory (ROM).

The external input/output unit 213 functions as an interface with all of the external apparatuses connected to the smart phone 200 and is directly or indirectly connected to other external apparatuses by communication (for example, a universal serial bus or IEEE1394) or a network (for example, the Internet, a wireless local area network (LAN), a Bluetooth (registered trademark) network, a radio frequency identification (RFID) network, an infrared communication network, an ultra wideband (UWB) (registered trademark) network, or a ZigBee (registered trademark) network).

Examples of the external apparatus connected to the smart phone 200 include a wired/wireless headset, a wired/wireless external charger, a wired/wireless data port, a memory card which is connected through a card socket, a subscriber identity module (SIM) card, a user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, an earphone which is connected wirelessly or in a wired manner. The external input/output unit 213 can transmit data which is received from the external apparatus to each component of the smart phone 200 or can transmit data in the smart phone 200 to the external apparatus.

The GPS receiving unit 214 receives GPS signals transmitted from GPS satellites ST1 to STn and performs a position measurement process on the basis of a plurality of received GPS signals to detect a position including the latitude, longitude, and height of the smart phone 200, in response to a command from the main control unit 220. When the GPS receiving unit 214 can acquire positional information from the wireless communication unit 210 or the external input/output unit 213 (for example, a wireless LAN), it can detect the position using the positional information.

The motion sensor unit 215 comprises, for example, a triaxial acceleration sensor and detects the physical movement of the smart phone 200 in response to a command from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to a command from the main control unit 220.

The main control unit 220 comprises a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which browses web pages.

The main control unit 220 has, for example, an image processing function which displays a video on the display input unit 204 on the basis of image data (still image data or motion picture data) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control for detecting the operation of the user input through the operation unit 207 and the operation panel 203. The main control unit 220 performs the display control to display a software key, such as an icon for starting application software or a scroll bar, or to display a window for creating electronic mail.

The scroll bar means a software key for receiving a command to move a displayed portion of an image that is too large to fit into the display region of the display panel 202.

The main control unit 220 performs the operation detection control to detect the operation of the user input through the operation unit 207, to receive an operation for the icon or the input of a character string to an input field of the window through the operation panel 203, or to receive a request to scroll the displayed image through the scroll bar.

In addition, the main control unit 220 has a touch panel control function that performs the operation detection control to determine whether the position of an operation for the operation panel 203 is an overlap portion (display region) which overlaps the display panel 202 or an outer edge portion (non-display region) which does not overlap the display panel 202 other than the overlap portion and controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 208 includes the structures other than the external memory control unit 21, the recording medium 22, the display control unit 23, the display unit 24, and the operation unit 14 in the digital camera illustrated in FIG. 1.

The captured image data generated by the camera unit 208 can be recorded in the storage unit 212 or can be output through the external input/output unit 213 or the wireless communication unit 210.

In the smart phone 200 illustrated in FIG. 9, the camera unit 208 is mounted on the same surface as the display input unit 204. However, the mounting position of the camera unit 208 is not limited thereto. For example, the camera unit 208 may be mounted on the rear surface of the display input unit 204.

The camera unit 208 can be used for various functions of the smart phone 200. For example, the image acquired by the camera unit 208 can be displayed on the display panel 202 or the image acquired by the camera unit 208 can be used as one of the operation inputs of the operation panel 203.

When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

In addition, for example, the positional information acquired by the GPS receiving unit 214, the voice information acquired by the microphone 206 (for example, the voice information may be converted into text information by the main control unit), and the posture information acquired by the motion sensor unit 215 may be added to still image data or motion picture data and the image data may be recorded in the storage unit 212 or may be output through the external input/output unit 213 or the wireless communication unit 210.

In the smart phone 200 having the above-mentioned structure, a flicker can be accurately distinguished and detected by the operations illustrated in FIGS. 3 to 8.

As described above, the following matters are disclosed in the specification.

A disclosed imaging apparatus comprises: an imaging element; an imaging element driving unit that directs the imaging element to alternately perform imaging operations at a first frame rate and a second frame rate different from the first frame rate; and a flicker detection unit that detects whether a first flicker of a light source with a first frequency is present and whether a second flicker of a light source with a second frequency is present, on the basis of a first captured image signal obtained by an imaging operation at the first frame rate and a second captured image signal obtained by an imaging operation at the second frame rate. A sum of the duration of a first frame period based on the first frame rate and the duration of a second frame period based on the second frame rate is a value obtained by multiplying a reciprocal of the first frequency or the second frequency by a natural number. The flicker detection unit detects whether the first flicker is present and whether the second flicker is present, on the basis of a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

In the disclosed imaging apparatus, in a case in which the sum is a value obtained by multiplying the reciprocal of the first frequency by a natural number, the flicker detection unit detects that the second flicker is present in a case in which the first coincidence is equal to or less than a first threshold value, detects that the first flicker is present in a case in which the first coincidence is greater than the first threshold value and the second coincidence is equal to or less than a second threshold value, and detects that there is no flicker in a case in which the first coincidence is greater than the first threshold value and the second coincidence is greater than the second threshold value.

In the disclosed imaging apparatus, in a case in which the sum is a value obtained by multiplying the reciprocal of the second frequency by a natural number, the flicker detection unit detects that the first flicker is present in a case in which the first coincidence is equal to or less than the first threshold value, detects that the second flicker is present in a case in which the first coincidence is greater than the first threshold value and the second coincidence is equal to or less than the second threshold value, and detects that there is no flicker in a case in which the first coincidence is greater than the first threshold value and the second coincidence is greater than the second threshold value.

In the disclosed imaging apparatus, the first frame rate is a value other than a value obtained by dividing the second frequency by a natural number. In a case in which the sum is a value obtained by multiplying the reciprocal of the first frequency by a natural number, the flicker detection unit detects that there is no flicker in a case in which the second coincidence is greater than a second threshold value, detects that the second flicker is present in a case in which the second coincidence is equal to or less than the second threshold value and the first coincidence is equal to or less than a first threshold value, and detects that the first flicker is present in a case in which the second coincidence is equal to or less than the second threshold value and the first coincidence is greater than the first threshold value.

In the disclosed imaging apparatus, the first frame rate is a value other than a value obtained by dividing the first frequency by a natural number. In a case in which the sum is a value obtained by multiplying the reciprocal of the second frequency by a natural number, the flicker detection unit detects that there is no flicker in a case in which the second coincidence is greater than the second threshold value, detects that the first flicker is present in a case in which the second coincidence is equal to or less than the second threshold value and the first coincidence is equal to or less than the first threshold value, and detects that the second flicker is present in a case in which the second coincidence is equal to or less than the second threshold value and the first coincidence is greater than the first threshold value.

In the disclosed imaging apparatus, in a case in which it is detected that the first flicker or the second flicker is present, the imaging element driving unit drives the imaging element under a driving condition for preventing deterioration of image quality due to the detected flicker.

In the disclosed imaging apparatus, the first frequency is 100 Hz and the second frequency is 120 Hz.

A disclosed flicker detection method comprises: an imaging element driving step of directing an imaging element to alternately perform imaging operations at a first frame rate and a second frame rate different from the first frame rate; and a flicker detection step of detecting whether a first flicker of a light source with a first frequency is present and whether a second flicker of a light source with a second frequency is present, on the basis of a first captured image signal obtained by an imaging operation at the first frame rate and a second captured image signal obtained by an imaging operation at the second frame rate. A sum of the duration of a first frame period based on the first frame rate and the duration of a second frame period based on the second frame rate is a value obtained by multiplying a reciprocal of the first frequency or the second frequency by a natural number. In the flicker detection step, it is detected whether the first flicker is present and whether the second flicker is present, on the basis of a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

In the disclosed flicker detection method, in a case in which the sum is a value obtained by multiplying the reciprocal of the first frequency by a natural number, in the flicker detection step, it is detected that the second flicker is present in a case in which the first coincidence is equal to or less than a first threshold value, that the first flicker is present in a case in which the first coincidence is greater than the first threshold value and the second coincidence is equal to or less than a second threshold value, and that there is no flicker in a case in which the first coincidence is greater than the first threshold value and the second coincidence is greater than the second threshold value.

In the disclosed flicker detection method, in a case in which the sum is a value obtained by multiplying the reciprocal of the second frequency by a natural number, in the flicker detection step, it is detected that the first flicker is present in a case in which the first coincidence is equal to or less than the first threshold value, that the second flicker is present in a case in which the first coincidence is greater than the first threshold value and the second coincidence is equal to or less than the second threshold value, and that there is no flicker in a case in which the first coincidence is greater than the first threshold value and the second coincidence is greater than the second threshold value.

In the disclosed flicker detection method, the first frame rate is a value other than a value obtained by dividing the second frequency by a natural number. In a case in which the sum is a value obtained by multiplying the reciprocal of the first frequency by a natural number, in the flicker detection step, it is detected that there is no flicker in a case in which the second coincidence is greater than a second threshold value, that the second flicker is present in a case in which the second coincidence is equal to or less than the second threshold value and the first coincidence is equal to or less than a first threshold value, and that the first flicker is present in a case in which the second coincidence is equal to or less than the second threshold value and the first coincidence is greater than the first threshold value.

In the disclosed flicker detection method, the first frame rate is a value other than a value obtained by dividing the first frequency by a natural number. In a case in which the sum is a value obtained by multiplying the reciprocal of the second frequency by a natural number, in the flicker detection step, it is detected that there is no flicker in a case in which the second coincidence is greater than the second threshold value, that the first flicker is present in a case in which the second coincidence is equal to or less than the second threshold value and the first coincidence is equal to or less than the first threshold value, and that the second flicker is present in a case in which the second coincidence is equal to or less than the second threshold value and the first coincidence is greater than the first threshold value.

The disclosed flicker detection method further comprises a driving step of, in a case in which it is detected that the first flicker or the second flicker is present, driving the imaging element under a driving condition for preventing deterioration of image quality due to the detected flicker.

In the disclosed flicker detection method, the first frequency is 100 Hz and the second frequency is 120 Hz.

A disclosed flicker detection program causes a computer to perform: an imaging element driving step of directing an imaging element to alternately perform imaging operations at a first frame rate and a second frame rate different from the first frame rate; and a flicker detection step of detecting whether a first flicker of a light source with a first frequency is present and whether a second flicker of a light source with a second frequency is present, on the basis of a first captured image signal obtained by an imaging operation at the first frame rate and a second captured image signal obtained by an imaging operation at the second frame rate. A sum of the duration of a first frame period based on the first frame rate and the duration of a second frame period based on the second frame rate is a value obtained by multiplying a reciprocal of the first frequency or the second frequency by a natural number. In the flicker detection step, it is detected whether the first flicker is present and whether the second flicker is present, on the basis of a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

INDUSTRIAL APPLICABILITY

The invention is particularly applied to, for example, digital cameras or business video cameras and is convenient and effective.

The invention has been described above with reference to a specific embodiment. However, the invention is not limited to the embodiment and various modifications and changes of the invention can be made without departing from the scope and spirit of the disclosed invention.

This application is based on JP2015-040267, filed on Mar. 2, 2015, the content of which is incorporated herein by reference.

What is claimed is:

1. An imaging apparatus comprising:
an imaging element;
an imaging element driving unit that directs the imaging element to alternately perform imaging operations at a first frame rate and a second frame rate being different from the first frame rate; and
a flicker detection unit that detects whether a first flicker of a light source with a first frequency is present and whether a second flicker of a light source with a second frequency is present, based on a first captured image signal obtained by an imaging operation at the first frame rate and a second captured image signal obtained by an imaging operation at the second frame rate,
wherein a sum of a duration of a first frame period based on the first frame rate and a duration of a second frame period based on the second frame rate is a value obtained by multiplying a reciprocal of the first frequency or the second frequency by a natural number, and
the flicker detection unit detects whether the first flicker is present and whether the second flicker is present, based on a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

2. The imaging apparatus according to claim 1,
wherein, in a case in which the sum is a value obtained by multiplying the reciprocal of the first frequency by a natural number, the flicker detection unit detects that the second flicker is present in a case in which the first coincidence is equal to or less than a first threshold value, detects that the first flicker is present in a case in which the first coincidence is greater than the first threshold value and the second coincidence is equal to or less than a second threshold value, and detects that there is no flicker in a case in which the first coincidence is greater than the first threshold value and the second coincidence is greater than the second threshold value.

3. The imaging apparatus according to claim 2,
wherein, in a case in which the sum is a value obtained by multiplying the reciprocal of the second frequency by a natural number, the flicker detection unit detects that the first flicker is present in a case in which the first coincidence is equal to or less than the first threshold value, detects that the second flicker is present in a case in which the first coincidence is greater than the first threshold value and the second coincidence is equal to or less than the second threshold value, and detects that there is no flicker in a case in which the first coincidence is greater than the first threshold value and the second coincidence is greater than the second threshold value.

4. The imaging apparatus according to claim 2,
wherein, in a case in which the flicker detection unit detects that the first flicker or the second flicker is present, the imaging element driving unit drives the imaging element under a driving condition for preventing deterioration of image quality due to the detected flicker.

5. The imaging apparatus according to claim 2,
wherein the first frequency is 100 Hz and the second frequency is 120 Hz.

6. The imaging apparatus according to claim 1,
wherein the first frame rate is a value other than a value obtained by dividing the second frequency by a natural number, and
in a case in which the sum is a value obtained by multiplying the reciprocal of the first frequency by a natural number, the flicker detection unit detects that there is no flicker in a case in which the second coincidence is greater than a second threshold value, detects that the second flicker is present in a case in which the second coincidence is equal to or less than the second threshold value and the first coincidence is equal to or less than a first threshold value, and detects that the first flicker is present in a case in which the second coincidence is equal to or less than the second threshold value and the first coincidence is greater than the first threshold value.

7. The imaging apparatus according to claim 6,
wherein the first frame rate is a value other than a value obtained by dividing the first frequency by a natural number, and
in a case in which the sum is a value obtained by multiplying the reciprocal of the second frequency by a natural number, the flicker detection unit detects that there is no flicker in a case in which the second coincidence is greater than the second threshold value, detects that the first flicker is present in a case in which the second coincidence is equal to or less than the second threshold value and the first coincidence is equal to or less than the first threshold value, and detects that the second flicker is present in a case in which the second coincidence is equal to or less than the second threshold value and the first coincidence is greater than the first threshold value.

8. The imaging apparatus according to claim 1,
wherein, in a case in which the flicker detection unit detects that the first flicker or the second flicker is present, the imaging element driving unit drives the imaging element under a driving condition for preventing deterioration of image quality due to the detected flicker.

9. The imaging apparatus according to claim 1,
wherein the first frequency is 100 Hz and the second frequency is 120 Hz.

10. A flicker detection method comprising:
an imaging element driving step of directing an imaging element to alternately perform imaging operations at a first frame rate and a second frame rate being different from the first frame rate; and
a flicker detection step of detecting whether a first flicker of a light source with a first frequency is present and whether a second flicker of a light source with a second frequency is present, based on a first captured image signal obtained by an imaging operation at the first frame rate and a second captured image signal obtained by an imaging operation at the second frame rate,
wherein a sum of a duration of a first frame period based on the first frame rate and a duration of a second frame period based on the second frame rate is a value obtained by multiplying a reciprocal of the first frequency or the second frequency by a natural number, and
in the flicker detection step, whether the first flicker is present and whether the second flicker is present are detected, based on a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

11. The flicker detection method according to claim 10,
wherein, in a case in which the sum is a value obtained by multiplying the reciprocal of the first frequency by a natural number, in the flicker detection step, it is detected that the second flicker is present in a case in which the first coincidence is equal to or less than a first threshold value, that the first flicker is present in a case in which the first coincidence is greater than the first threshold value and the second coincidence is equal to or less than a second threshold value, and that there is no flicker in a case in which the first coincidence is greater than the first threshold value and the second coincidence is greater than the second threshold value.

12. The flicker detection method according to claim 11,
wherein, in a case in which the sum is a value obtained by multiplying the reciprocal of the second frequency by a natural number, in the flicker detection step, it is detected that the first flicker is present in a case in which the first coincidence is equal to or less than the first threshold value, that the second flicker is present in a case in which the first coincidence is greater than the first threshold value and the second coincidence is equal to or less than the second threshold value, and that there is no flicker in a case in which the first coincidence is greater than the first threshold value and the second coincidence is greater than the second threshold value.

13. The flicker detection method according to claim 11, further comprising:
a driving step of, in a case in which the flicker detection step detects that the first flicker or the second flicker is present, driving the imaging element under a driving condition for preventing deterioration of image quality due to the detected flicker.

14. The flicker detection method according to claim 11,
wherein the first frequency is 100 Hz and the second frequency is 120 Hz.

15. The flicker detection method according to claim 10,
wherein the first frame rate is a value other than a value obtained by dividing the second frequency by a natural number, and
in a case in which the sum is a value obtained by multiplying the reciprocal of the first frequency by a natural number, in the flicker detection step, it is detected that there is no flicker in a case in which the second coincidence is greater than a second threshold value, that the second flicker is present in a case in which the second coincidence is equal to or less than the second threshold value and the first coincidence is equal to or less than a first threshold value, and that the first flicker is present in a case in which the second coincidence is equal to or less than the second threshold value and the first coincidence is greater than the first threshold value.

16. The flicker detection method according to claim 15,
wherein the first frame rate is a value other than a value obtained by dividing the first frequency by a natural number, and
in a case in which the sum is a value obtained by multiplying the reciprocal of the second frequency by a natural number, in the flicker detection step, it is detected that there is no flicker in a case in which the second coincidence is greater than the second threshold value, that the first flicker is present in a case in which the second coincidence is equal to or less than the second threshold value and the first coincidence is equal to or less than the first threshold value, and that the second flicker is present in a case in which the second coincidence is equal to or less than the second threshold value and the first coincidence is greater than the first threshold value.

17. The flicker detection method according to claim 10, further comprising:
a driving step of, in a case in which the flicker detection step detects that the first flicker or the second flicker is present, driving the imaging element under a driving condition for preventing deterioration of image quality due to the detected flicker.

18. The flicker detection method according to claim 10,
wherein the first frequency is 100 Hz and the second frequency is 120 Hz.

19. A non-transitory computer readable medium storing a flicker detection program that causes a computer to perform:
an imaging element driving step of directing an imaging element to alternately perform imaging operations at a first frame rate and a second frame rate different from the first frame rate; and
a flicker detection step of detecting whether a first flicker of a light source with a first frequency is present and whether a second flicker of a light source with a second frequency is present, based on a first captured image signal obtained by an imaging operation at the first frame rate and a second captured image signal obtained by an imaging operation at the second frame rate,
wherein a sum of a duration of a first frame period based on the first frame rate and a duration of a second frame period based on the second frame rate is a value obtained by multiplying a reciprocal of the first frequency or the second frequency by a natural number, and in the flicker detection step, whether the first flicker is present and whether the second flicker is present are detected, based on a first coincidence between a set of the first captured image signals or a set of the second captured image signals and a second coincidence between the first captured image signal obtained for the first frame period in the imaging operation at the first frame rate and the second captured image signal obtained for the second frame period following the first frame period.

* * * * *